Dec. 26, 1967   H. T. STEVINSON ET AL   3,360,728
INDICATOR DEVICE FOR RELEASE FROM AIRCRAFT
Filed May 6, 1965   4 Sheets-Sheet 1
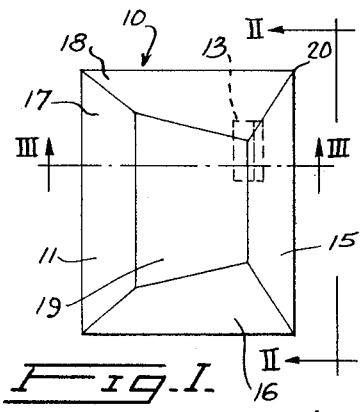
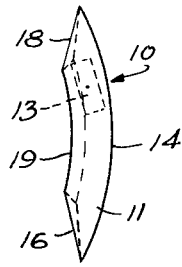
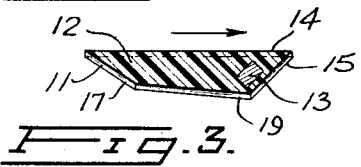
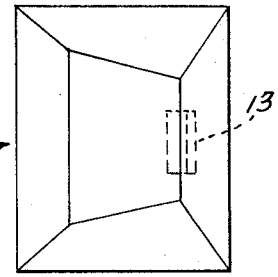
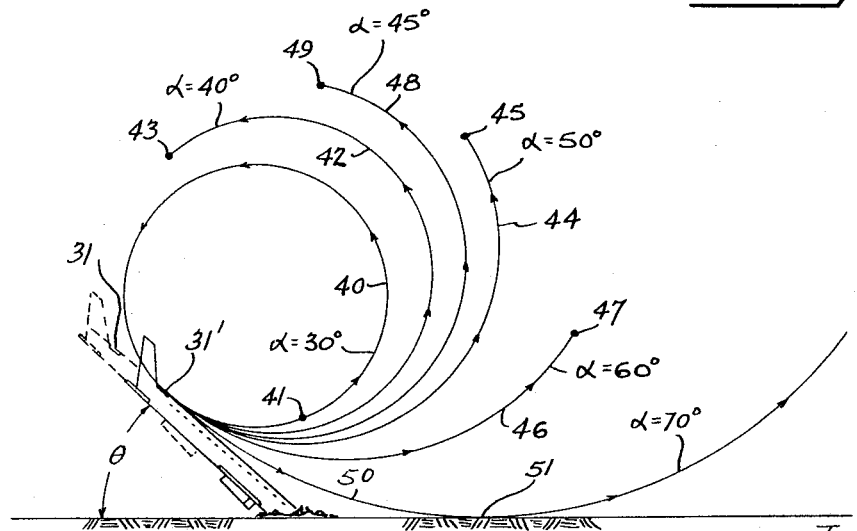

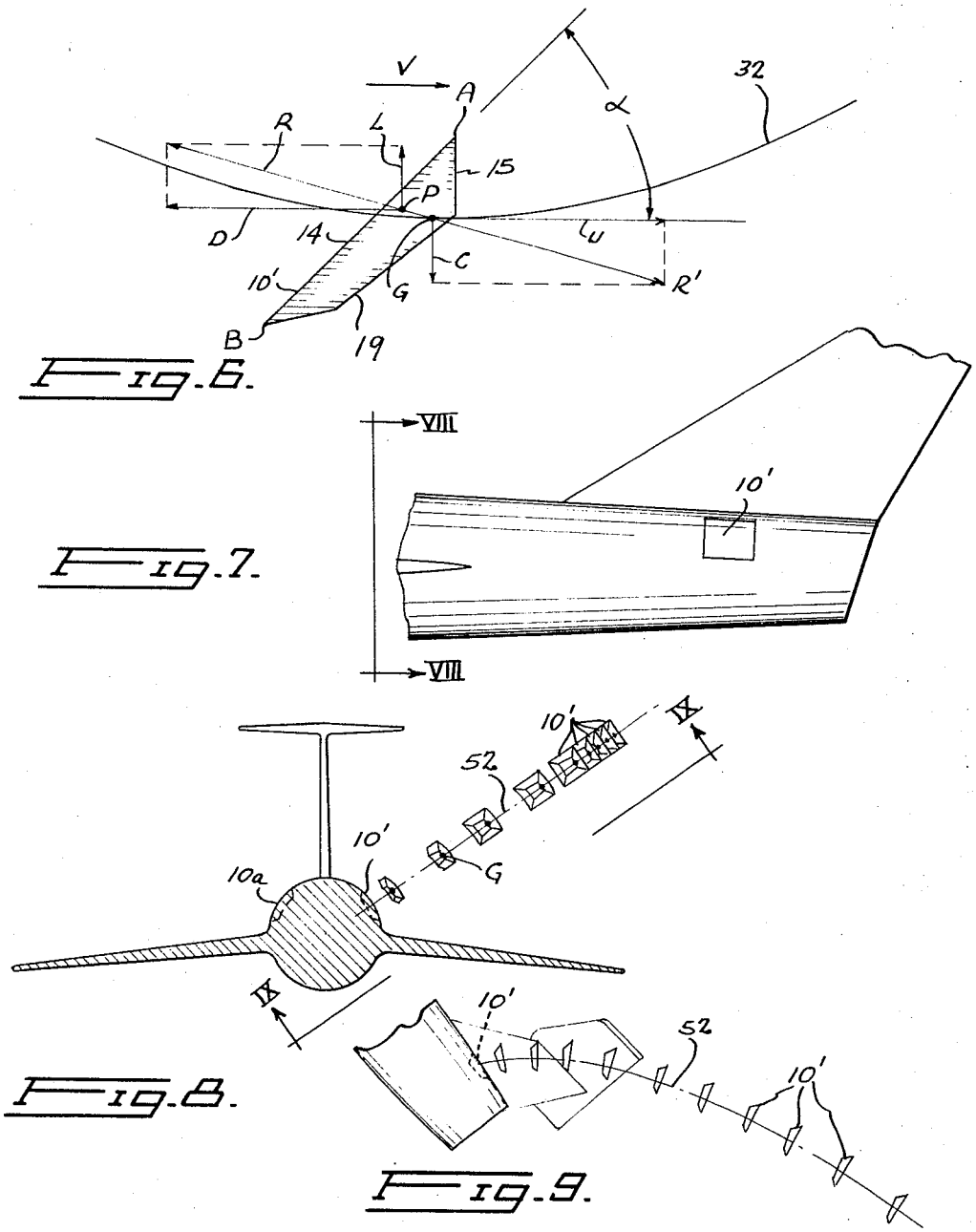

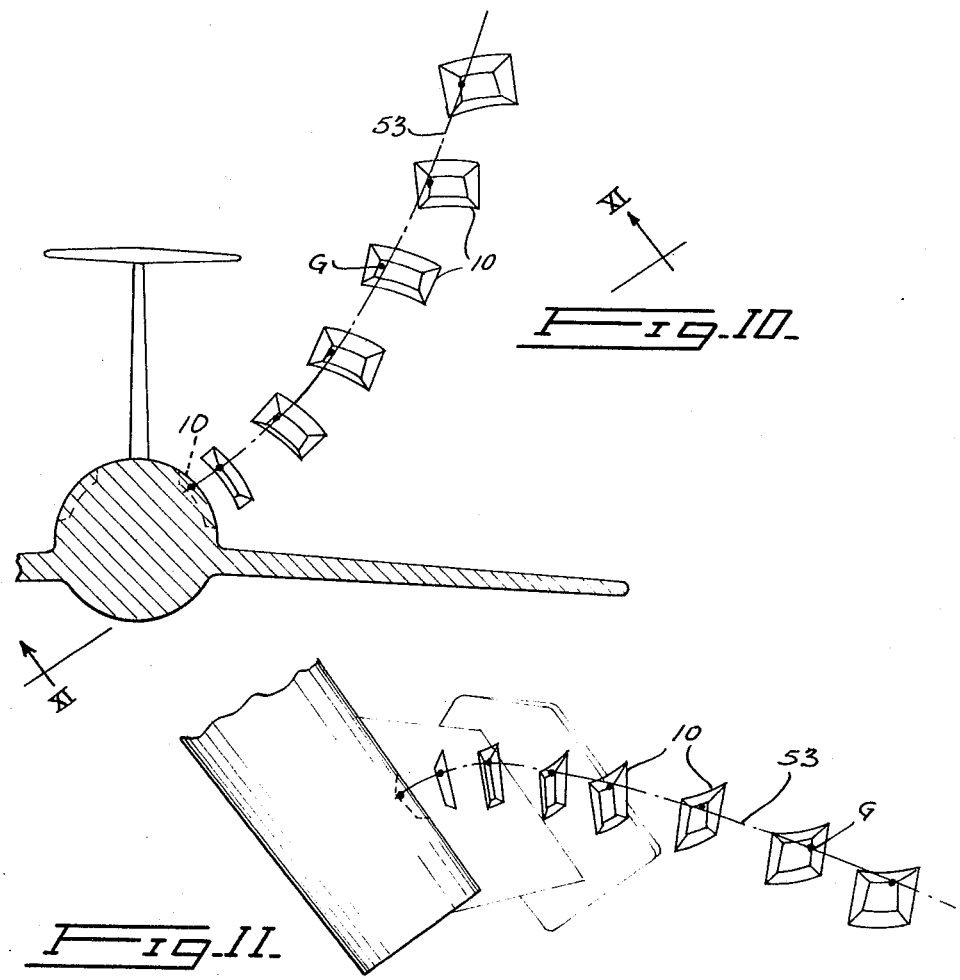
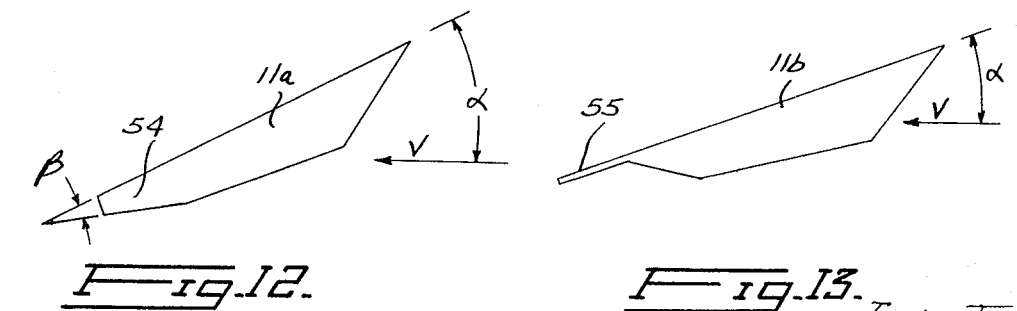

Inventors
Harry T. Stevinson
Douglas A. Baker
George O. C. Paynter
By Stevens, Davis, Miller & Mosher
Attorneys United States Patent Office 3,360,728
Patented Dec. 26, 1967

3,360,728
INDICATOR DEVICE FOR RELEASE FROM AIRCRAFT
Harry T. Stevinson, Douglas A. Baker, and George O. C. Paynter, Ottawa, Ontario, Canada, assignors to Canadian Patents and Development Limited, Ottawa, Ontario, Canada, a corporation of Canada
Filed May 6, 1965, Ser. No. 453,660
11 Claims. (Cl. 325—114)

ABSTRACT OF THE DISCLOSURE

A crash position indicator device for release from aircraft that includes an indicator (radio beacon) for assisting searching for downed aircraft.

---

The device consists of a casing in the shape of an airfoil mounted in a shallow socket in the aircraft skin. The casing contains a mass of energy absorbing material arranged around the radio beacon to protect it from damage on striking the ground. Release is arranged to take place automatically at the moment of crash. The casing is weighted with its centre of gravity in a forward location to cause it to be stable in edgewise flight, the dimensions being so chosen that the device will enjoy a reasonable expectation of a sufficient flight distance from the site of the crash to avoid destruction.

In a modification, the centre of gravity is located at both a forward and a laterally displaced position to cause the device to fly away from the crashed aircraft in a predetermined curved flight path.

In another modification, the device is mounted in the aircraft skin in reverse orientation, i.e. with the centre of gravity to the rear, in order to cause the device to flip over through about 180° on leaving its socket in the aircraft skin.

This invention relates to improvements in the manner of construction and in the manner of deployment of devices employed in aircraft for release therefrom under emergency conditions, for example devices intended for the purpose of providing a subsequent indication of the site of the emergency and for aiding recovery and rescue operations.

United States Patent No. 2,959,671 issued Nov. 8, 1960, to H. T. Stevinson describes a releasable indicator device that is designed for mounting at the rear of an aircraft. The device is mounted at the surface of the aircraft with an outer face of the device forming a smooth continuation of the outer skin of the aircraft. This device can be deployed, either by manual control by the pilot, or automatically on crashing or disintegration of the aircraft. The prior patent illustrates and describes deployment means for this purpose, and further explains a number of physical forms which the indicator device may take.

In terms of shape, the indicator device described in the above patent can be considered as having an airfoil shaped casing which is generally flat and of shallow truncated pyramidal form, although the base of the pyramid forms a part of the surface of a cylinder or a cone. This base constitutes the outer surface of the device when in use, and is thus called upon to have the same curvature as the skin of the aircraft at the location where the device is mounted. Such location will be at the rear of the aircraft, normally on the main fuselage, and consequently will usually involve a surface of appreciable curvature.

As explained in the prior patent, the device will be made comparatively light so that the powerful lift and drag forces generated on deployment from the aircraft by the airstream will slow down and deflect the device from the high speed expected at the instant of crashing to a safe landing speed before the device comes into contact with hard ground or other solid objects. The instrument payload of the device consists basically of a radio beacon for directing searchers to the site, but may also include recording equipment or the like. This payload is mounted centrally within the device and is surrounded by a thick layer of foamed plastic. Foamed plastic material is tough, light and excellent for absorbing mechanical energy on impact. It provides a high strength to weight ratio enabling the device to withstand aerodynamic and landing stresses. Use of such material is also in keeping with the need for a low specific gravity of the device as a whole, which is necessary to ensure that the device will curve away and slow down rapidly on deployment, will float on water and will not penetrate unduly deeply into snow, sand, muskeg or other relatively loose terrain.

The method of mounting such a device disclosed in the prior patent involves locating the same as a low excrescence or in a socket at the rear of the aircraft, with the device disposed generally edge-on to the direction of travel of the aircraft and hence to the direction of the initial velocity that will be imparted to it upon release at the moment of impact. While the mounting gear in the aircraft thus includes means for releasably supporting the indicator device generally edgewise to the direction of the airstream, such means also includes means for initially causing rapid separation of the leading edge of the device from the mounting. The resultant rapid entry of ram air beneath the device increases its speed of deployment as a whole and also tends to initiate rapid rotation of the device towards a position flatwise with respect to the airstream direction.

It is a feature of the indicator device described in the above mentioned patent that it is so constructed and arranged as to be substantially unstable in edgewise flight. After release from its mounting, this instability normally caused the device to continue to rotate continuously during travel through the air. Accordingly, for the majority of the time it experienced a high drag and a moderate lift and a consequent rapid deceleration and moderate curvature of trajectory.

It has now been discovered that enhanced performance of such an indicator device can be obtained by constructing the same to be capable of stable flight at an angle of attack intermediate between flatwise and edgewise flight, provided the angle of attack is carefully selected and other constructional requirements are observed which are such as to cause the device, after deployment, to follow a flight path comprising a comparatively large and predictable loop through the air. These results can be obtained by special location of the centre of gravity of the device in a manner that will be more fully explained below. These considerations are illustrated diagrammatically in the accompanying drawings, such drawings being provided by way of example only, and not by way of limitation of the scope of the invention, which latter is defined in the appended claims.

In the drawings:
FIGURE 1 is an underside view of a preferred form of indicator device constructed in accordance with the present invention;
FIGURE 2 is a view of the device of FIGURE 1 as seen on the line II—II;
FIGURE 3 is a section on the line III—III in FIGURE 1;
FIGURE 4 is a view similar to FIGURE 1 of a modified form of indicator device;
FIGURE 5 is a diagram illustrating certain characteristics of operation of a device according to the invention on crashing of an aircraft;

FIGURE 6 is a diagram illustrating the forces acting on an indicator device during flight;

FIGURE 7 shows such a device mounted in the tail of an aircraft;

FIGURE 8 is a view of the aircraft of FIGURE 7 from the line VIII—VIII, including a diagrammatic representation of a flight path for the device, which is here assumed to be of the form shown in FIGURE 4;

FIGURE 9 is a view taken in the direction IX—IX in FIGURE 8;

FIGURE 10 is a view similar to FIGURE 8 in the case of use of a device as illustrated in FIGURES 1 to 3;

FIGURE 11 is a view on the line XI—XI in FIGURE 10;

FIGURE 12 is a side view of a modified form of device;

FIGURES 13 and 14 are respective side views of yet other modifications of the device.

Figure 14:
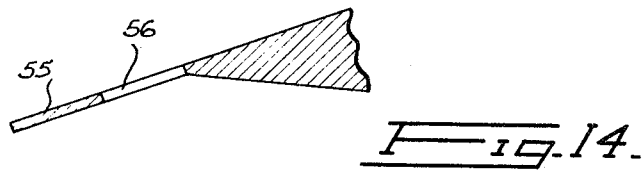

FIGURES 1 to 3 show an indicator device 10 which is fundamentally constructed in the same way as in the said prior patent but which has been modified in accordance with the present invention. It comprises a casing 11 shaped similar to that shown in the prior patent and which contains a mass 12 of light, tough, energy-absorbent material substantially filling its interior. Such material will preferably comprise one of the pourable foam plastic materials that subsequently set in a rigid structure. The payload 13 of the device will be seen no longer to be mounted in the geometric centre of the casing, but at a location well forward and upwardly, as in FIGURE 1. The payload 13 may be assumed to comprise a radio beacon and a recorder. The specific nature of the payload may be conventional and in any event is not germane to the present inventive advance; consequently no detailed description thereof will be provided. However, the location of the payload 13 in three dimensions is important, because it is this location that controls the position of the centre of gravity of the device which is now forward, inward and upward in comparison with that of the device described in the prior patent, for a purpose to be described below. It will be apparent, of course, that the same effect could be achieved by the payload continuing to be located centrally of the casing, with additional weighty material located forwardly, inwardly and upwardly. However, since normally it is desired to keep the total weight of the device as low as possible, it will usually be preferred to utilize the existing weight of the payload to achieve the desired special positioning of the centre of gravity. The device 10 has a curved outer surface 14 and flat surfaces 15, 16, 17 and 18 which together with an inner curved surface 19 generally define a shallow truncated pyramid.

As an alternative, the location of the payload 13 may be only forward and inward, as shown in the device 10' seen in FIGURE 4, the upward displacement being omitted. A cross-section of FIGURE 4 will appear essentially the same as FIGURE 3.

A somewhat simplified pictorial representation of events that may typically take place during an aircraft crash is shown in FIGURE 5. For purposes of preliminary explanation this drawing takes into account only two dimensions. As explained below it is necessary in practice to consider the flight of the device in three dimensions, but nevertheless FIGURE 5 will serve to demonstrate some of the principles involved. This drawing shows an aircraft 30 assumed to be crashing on its nose at an angle $\theta$ to the ground. The block marked 31 represents the location of the device on the aircraft and is assumed for this explanation to be at the top of the rear part of the fuselage. To take account of the time delay in the operation of the automatic release of the device, for example by such means as a frangible switch in the nose or in a wing tip of the aircraft, the location 31' is taken as the position to which the device will have moved before deployment is effective. Thus the broken lines show the position of the aircraft at the instant of making contact with the ground; the full lines show its condition when release is effective.

Before continuing with a discussion of FIGURE 5 it will be convenient to consider FIGURE 6 which is a diagram showing the forces acting on the device 10' as it travels in a typical curved flight path 32 after leaving the aircraft. To simplify the explanation, the effect of gravity will be ignored. At any given instant, the device will be travelling with a tangential velocity V. For any given angle of attack $\alpha$ which is the angle between the instantaneous direction of travel relative to the air mass and a chord line taken along the centre line of the outer surface 14, the device will experience a lift L and a drag D. The lift coefficient will be a maximum for a value of $\alpha$ of approximately 30°, while the drag coefficient increases to a maximum as the angle $\alpha$ increases to approximately 90°. For reasons which will later become apparent, the preferred range of interest of the present invention is usually for values of $\alpha$ from approximately 40° to 50°, over which range both the lift and drag have substantial values, even though neither may be at its maximum. The lift L and drag D both act through the centre of pressure P of the device and they combine to provide a resultant force R. The location of the centre of pressure P will depend on the shape of the casing in accordance with known aerodynamic principles, and will not be a fixed position. However, for a given shape of casing, a given angle of attack $\alpha$ and a given velocity, the centre of pressure for flight in standard air will be fixed. The device cannot continue to move in a straight line, but must be deflected therefrom by the lift L, and may be assumed to be deflected along the curved flight path 32, the radius of curvature of which will automatically adjust itself to be such that the centrifugal force C (inversely dependent on the radius of curvature) balances the lift L. The centrifugal force C will act through the centre of gravity G of the device as also will the reaction to deceleration U, these two giving rise to a resultant R' which will balance the resultant R. If the lines of action of the resultants R and R' are not coincident, there will be a turning moment exerted on the device tending to reorient the same until they are coincident, as shown in FIGURE 6. There may be some oscillation of the device about this stable condition, which normally should quickly disappear, so that the device continues to travel in the curved flight path 32 with a substantially constant angle of attack $\alpha$. The degree of firmness of the stability, that is the resistance to wobbling, is largely dependent on the distance between centres P and G, and is also dependent on the fact that the position of the centre of pressure P varies with the angle of attack.

Also the flight path will not be exactly circular, since the device will be losing speed. However, since reduced velocity results in both reduced lift and reduced centrifugal force, the effects of the variations of these two factors tend to cancel each other, so that the device will move in a flight path that is comparatively close to being a true circle, at least until it has been slowed down near to its safe landing speed, for example to about 70 miles an hour, at which velocity the effect of gravity is no longer negligible. After that time the flight performance of the device has to be considered from a somewhat different point of view. FIGURE 6 is true also for the device 10 (FIGURES 1 to 3) where the centre of gravity is also laterally displaced, as far as the two dimensions considered in FIGURE 6 is concerned. As is explained below, there are additional factors to take into account resulting from the lateral displacement of the centre of gravity.

FIGURE 5 shows a series of circular flight paths for various values of the angle of attack $\alpha$, for a typical device deployed at a supersonic speed of approximately Mach 1.6. As will be seen, with $\alpha$ as low as 30°, the device theoretically executes a full circular flight path 40 terminating at the point 41 which is the point at which a safe landing speed (e.g. 40 miles an hour) has been achieved. In reality, it is unlikely that the device would survive passing again through the hazardous crash location; consequently such an angle of attack is undesirably low in this case. One of the desires of the present device and its method of deployment is that the device should be removed as far as possible from the scene of the crash, so as to improve its chances of escaping damage by fire, explosion or debris. With an angle $\alpha = 40°$, the device 10 executes a flight path 42 and reaches its safe landing speed at point 43. With the angle of attack $\alpha = 50°$, the flight path is shown at 44 and attainment of a safe landing speed at point 45; for $\alpha = 60°$, the flight path is shown at 46 and the attainment of a safe landing speed at point 47. It will be apparent that an angle of 45° for $\alpha$ will in many respects be ideal, giving rise to the flight path shown at 48 and the attainment of a safe landing speed at point 49 which is a relatively high point. Subsequent travel of the device after it has reached a safe landing speed, is largely dominated by the wind. When a low speed is achieved at a relatively high altitude, there is an excellent chance that the device will fall to earth a safe distance away from the wreckage. FIGURE 5 thus demonstrates that the range from 40° to 50° for the angle $\alpha$ will be the most suitable range in practice, for the conditions assumed. It will however be appreciated that FIGURE 5 is the result of tests and calculations using certain typical values for such variables as aircraft speed on deployment, device weight and device shape, and that, as these factors are varied, so will the best range of values for $\alpha$. Nevertheless, the principle remains that choice of device shape and centre of gravity location can be made to yield a value for $\alpha$ which is best for a given set of conditions, thus taking advantage of the basic concept of the present invention which is to cause the device to travel in stable flight in an arc after leaving the aircraft.

The curve 50 in FIGURE 5 is intended to represent the lowest possible flight path for the device 10. It will be noticed that the curve 50 has been drawn as tangential to the ground 51. If the curve 50 had had any less curvature, the device would crash into the ground at approximately the point 51 or nearer the aircraft, and would be likely to be destroyed, firstly because it would probably not have had time to lose sufficient velocity, and secondly because it would probably not be far enough removed from the scene of the crash to escape the anticipated fire or explosion. Curve 50 has been shown in FIGURE 5 as corresponding typically to a value of $\alpha$ of 70°, but it will be appreciated that this is only representational. It will depend among other considerations on the value of $\theta$. FIGURE 5 shows comparatively unfavorable conditions, in that the angle $\theta$ has been made comparatively large. For an aircraft crashing more horizontally, the device will clear the ground and any projections such as trees or buildings with greater certainty.

It will have been noted from FIGURE 6, that in order for the device to have stable flight in one of the paths illustrated in FIGURE 5, it is necessary for the centre of gravity G to be located forwardly in the casing. As a practical measure of the degree of forward shift of the centre of gravity G, it is convenient to consider the front to rear dimension of the casing along the chord line taken along the centre line of the outer surface 14. Treating the leading edge A as 0% and the trailing edge B as 100%, the location of the centre of gravity G in the front to rear direction can be expressed as a percentage of the chord line along the surface 14, for example, the centre of gravity G can be defined as located at say the 40% position back along such chord. In practice, the preferred range for location of the centre of gravity G in this direction will be from approximately 30 to 45% in most practical cases, the range of 35 to 40% normally being the most preferred. It is also desirable to locate the centre of gravity G inwardly in the casing, that is more towards the surface 19 than would normally be the case.

The location of the centre of gravity G is in substantial measure controlled by the location of the payload 13 which is of much greater specific gravity than the casing and the light foam which otherwise fills the casing. It is for this reason that the payload 13 is located in a forward and inward position in the device of the present invention.

FIGURE 5 has been constructed on the assumption that the aircraft crashes with zero roll angle and that the device was mounted facing directly upward; the plane of the trajectories shown is thus coincident with the plane of the paper. Also a level earth surface has been assumed. In practice, all three of these factors may vary. Firstly the aircraft may crash with a rotation about its own longitudinal axis. Another consideration, which is often an important factor, is the common practical need to locate the device somewhat down the side rather than at the top of the aircraft fuselage. This requirement is often dictated by the construction of the aircraft and the relatively small amount of free space which is usually available for the mounting of additional equipment.

In this connection, attention is directed to the location of the device 10' in FIGURES 7 to 9, where it is shown facing partly upwardly and partly outwardly. For examples of forms of socket mountings for the device in this location reference may be had to copending United States patent application of H. T. Stevinson et al., Ser. No. 413,177 filed Nov. 23, 1964.

The flight path 52 shown in FIGURES 8 and 9 appears differently from the trajectories in FIGURE 5, because it has been plotted relative to the moving aircraft in FIGURE 9, rather than relative to the fixed air mass as in FIGURE 5. In the FIGURE 8 view the two types of presentation appear the same. Such path 52 now shows the direction of travel of the device 10', moving directly outwardly from the aircraft along one of the curves shown in FIGURE 5.

FIGURES 10 and 11 show how the device 10 illustrated in FIGURES 1 to 3 behaves. It moves in a path 53, because its centre of gravity has not only been moved forwardly of the centre of pressure, in the manner shown in FIGURE 6, but has also been moved laterally of the fore and aft centre line of the device (see FIGURES 1 and 2). This lateral displacement can be visualized as having roughly the same effect in the transverse direction of release as the forward displacement has in the outward direction of release. In other words the device will follow the flight path 53 and will also tilt about the axis defined by the flight path, this additional tilt angle causing the device to deflect out of its former plane. In the illustrated case the device has been mounted in the aircraft in such a way that the lateral displacement of the centre of gravity is an upward displacement. As a result the path 53 curves upwardly and away from the path 52 (compare FIGURES 10 and 8). If the lateral shift of the centre of gravity were made a downward shift, the flight path would curve downwardly. Normally, an upwardly curving flight path will be chosen, as it tends to compensate for the sideways mounting of the device in the aircraft.

It will be appreciated that the flight path 53 can be varied by variation of the exact location of the centre of gravity, thus varying the angles of attack of the device in the two directions. A flight curve such as that shown at 48 in FIGURE 5 may be chosen for example by the amount of forward and inward shift of the centre of gravity, but the actual path travelled will be complicated by the curvature produced in the transverse plane (FIGURE 10), the nature of which will depend on the amount of lateral shift of the centre of gravity. Typically, while the forward shift of the centre of gravity may result in its being located about 35 to 40% of the distance back along the chord line the upward shift will usually be rather less, say about 2 to 7% from the front to rear centre line in the transverse dimension of the device.

The flight paths 52 and 53 serve to demonstrate the principle involved and to show the general direction of travel of the device 10' or 10 as the case may be. Since so many possible quantitative variations can be introduced by the designer of an individual system intended for a particular aircraft, and, since the exact conditions of a crash are never known in advance, it would be meaningless to attempt to illustrate herein any exact travel path in three dimensions that a device will follow. The important consideration is that the device should be capable of having statistically a high chance of survival, over a comparatively wide range of variable conditions (e.g. aircraft speed, aircraft angle of drive, and aircraft tilt at the moment of crashing). In addition to these variables which can only be guessed at in advance, there are also the known factors associated with the location of the device on the aircraft, which nevertheless may vary considerably from one aircraft to another.

To provide an additional safeguard, especially in the event that the aircraft should crash tilted clockwise as seen in FIGURE 8, a second similar device 10a may be installed on the opposite side of the aircraft fuselage. In this case, i.e. when two releasable devices are mounted on the aircraft, the devices may conveniently be so shaped and weighted that their respective resultant flight paths diverge somewhat from each other. In this way, at least one of the devices will have a flight path with a substantial vertically upward component over a comparatively wide range of aircraft tilt clockwise or anticlockwise from the level state shown in FIGURE 7. It is mainly in these circumstances, i.e. with two devices in use, especially when the devices are not mounted very far down the side of the aircraft fuselage, that devices of the type 10' are most useful. At other times one or more devices of the type 10 are usually preferred.

FIGURES 12 and 13 show modifications to the shape of the casing 11 that may be adopted for the achievement of improved flight conditions. In FIGURE 12, the casing 11a is formed with a thickened rear edge 54. Selection of the angle $\beta$ during construction of the casing 11a enables close control to be exercised over the angle of attack with which the device will fly. In FIGURE 13, the casing 11b has been modified by the addition of a rearwardly projecting vane 55 from the trailing edge. Without such a vane, some devices are bistable, in that they are also capable of stable flight in an attitude in which the back surface 14 leads (for example, with the device turned about 90° clockwise from the orientation shown in FIGURE 6). Although the device will be so released from the aircraft as to take up its proper flight attitude, the possibility that it could, if subjected to unusual deployment forces, take up a less favourable attitude, can be eliminated by use of the vane 55 which by suitable dimensioning can be made to render the device monostable in a flight attitude substantially as shown in FIGURE 6.

As yet a further improvement the vane 55 may be provided with a slot 56, as shown in FIGURE 14. The slot 56 further increases the stability of the device in flight, by preventing the formation of downstream vortices of sufficient strength to react unfavourably on the stability of the device.

Figure 15:
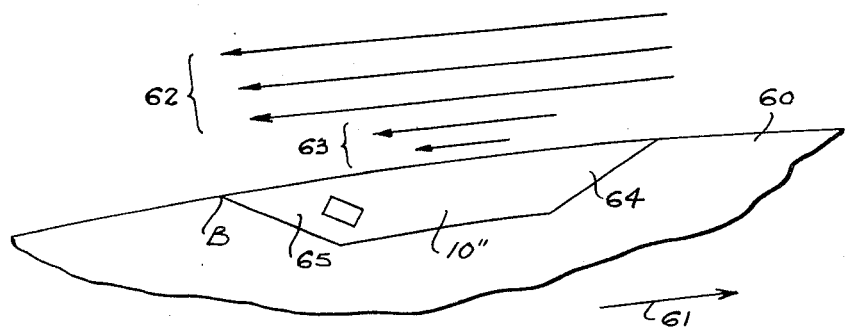
FIGURES 15 and 16 illustrate another form of device.
Figure 16:
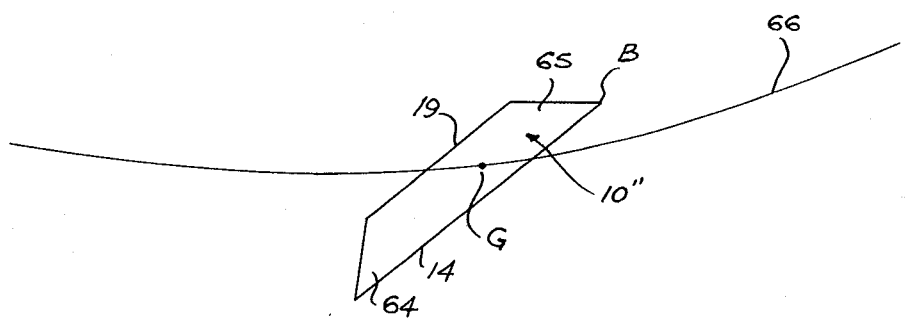

Another alternative is shown in FIGURES 15 and 16. The former shows an indicator device 10" mounted in the body of an aircraft 60, the direction of travel which is indicated by the arrow 61. The main airstream is shown by the long arrows 62 and the boundary layer by the shorter arrows 63. On short aircraft the boundary layer is of little significance to the operation of the present device, but on long aircraft the effect and extent of the boundary layer may become substantially greater. Consider for example the effect of deployment of the device 10" from its socket in the aircraft 60. Such deployment will involve rapid forcing of the forward part 64 outwardly of the socket, as the result of an ejection spring and the ram air which enters the socket beneath the device immediately it starts to deploy. When the forward part 64 enters the main airstream 62, the velocity change from the boundary layer to the main airstream may be so great that the anticlockwise turning of the device 10" is continued beyond the approximately 45° that would be required to achieve the orientation of FIGURE 6. This rotation may continue for approximately a further 180°, sufficient to bring the device 10" to the orientation shown in FIGURE 16, an occurrence that will be aided by location of the centre of gravity G towards the rearward surfaces 65 (as mounted in the aircraft) which now become the leading surfaces (in flight). This location of the centre of gravity G, if sufficiently far forward in flight will result in stable edgewise flight in a curved path 66, with an angle of attack and other conditions similar to those pertaining in FIGURE 6. Whereas, in FIGURE 6 the centre of gravity G was also arranged slightly inwardly (towards surface 19); it will now tend to be located slightly outwardly (towards surface 14) in order to improve the stability of flight conditions.

The amount of rearward shift of the centre of gravity G will be comparable to the degree of forward shift in the FIGURE 6 embodiment; for example, the centre of gravity G will preferably be in the range of 35 to 40% forward on the chord line along the surface 14 from the rearmost edge B.

As before this centre of gravity shift will conveniently be achieved by rearward location of the payload, and may be combined with a lateral shift of the centre of gravity to give rise to a flight path which curves upwardly in the fashion of FIGURE 10, once the device 10" has reversed its orientation and adopted a stable edgewise flight condition.

We claim:
1. As a separable portion of an aircraft, an indicator device comprising a generally flat, airfoil-shaped, rigid casing having leading surfaces for presenting an angle of attack to the airstream during edgewise flight to generate lift and drag on the device, said casing containing a mass of light, tough, energy-absorbing material and an instrument payload, and means for weighting said device so that the centre of gravity thereof is located at a fixed predetermined position towards the leading surfaces and sufficiently forwardly and inwardly in the casing to result in stable edgewise flight with a substantial angle of attack.

2. An indicator device according to claim 1, wherein said leading surfaces present an angle of attack to the airstream during stable edgewise flight within the range of approximately 40° to 50°.

3. An indicator device according to claim 1, wherein the centre of gravity is located forwardly in the casing so as to be at a location within the range of approximately 30 to 45% back from the leading edge of the total front to rear dimension of the device.

4. As a separable portion of an aircraft, an indicator device comprising a generally flat, airfoil-shaped, rigid casing having forward and lateral surfaces for presenting an angle of attack to the airstream during edgewise flight with the portion of said casing at which said forward and lateral surfaces intersect leading, to generate lift and drag on the device, said casing containing a mass of light, tough, energy-absorbing material and an instrument payload, and means for weighting said device so that the centre of gravity thereof is located at a fixed predetermined position towards both said forward and lateral surfaces sufficiently forwardly, inwardly and laterally in the casing to result in stable edgewise flight with said portion leading.

5. An indicator device according to claim 4, wherein said forward surfaces present an angle of attack to the airstream during stable edgewise flight within the range of approximately 40° to 50°.

6. An indicator device according to claim 4, wherein the centre of gravity is located forwardly in the casing so as to be at a location within the range of approximately 30 to 45% back from the leading edge of the total front to rear dimension of the device.

7. An indicator device according to claim 6 wherein the centre of gravity is located laterally of the front to rear centre line of the casing by a distance of the order of approximately 2 to 7% of the total transverse dimension of the device.

8. At the rear of an aircraft, an assembly comprising an indicator device and a mounting therefor, said indicator device comprising a generally flat, airfoil-shaped, rigid casing, and said mounting including means for releasably supporting said indicator device generally edgewise to the airstream, said casing containing an instrument payload and a body of light, tough, energy-absorbing material, and means mounting said payload forwardly and inwardly in said casing to cause the centre of gravity of the device to be located at a fixed predetermined position in the forward part thereof sufficiently forwardly and inwardly in the casing to result in stable edgewise flight of the device with a substantial angle of attack.

9. At the rear of an aircraft an assembly comprising an indicator device and a mounting therefor, said indicator device comprising a generally flat, airfoil-shaped, rigid casing, and said mounting including means for releasably supporting said indicator device generally edgewise to the airstream, said casing having inclined forward surfaces for presenting a substantial angle of attack to the airstream when in free forward flight whereby to generate lift and drag on the device, said casing containing a mass of light, tough, energy absorbing material and an instrument payload, and means mounting said payload forwardly, inwardly and upwardly in said casing to cause the centre of gravity of the device to be located at a fixed predetermined position sufficiently forwardly and upwardly in the casing to result in stable edgewise flight with a substantial angle of attack and with the intersection of the forward and upper surfaces of the device leading in a flight path extending outwardly and upwardly from said mounting.

10. An indictaor device for use as a separable portion of an aircraft having a mounting including means for releasably supporting said device edgewise to the airstream, said device comprising a generally flat, airfoil-shaped, rigid casing, said casing having an outer surface defining the periphery of the device, an inner surface smaller than said outer surface, and forward, rear and side surfaces together defining a shape of generally truncated pyramidal form extending inwardly from said periphery to the edges of the inner surface, said casing containing a mass of light, tough, energy-absorbing material and in instrument payload, and means mounting said payload adjacent said inner and forward surfaces to cause the centre of gravity of the device to be located at a fixed predetermined position sufficiently forwardly and inwardly in the casing to result in stable edgewise flight of the device with said outer surface exhibiting a substantial angle of attack to the airstream.

11. As a separable portion of an aircraft, an indicator device comprising a generally flat, airfoil-shaped, rigid casing having forward and rearward surfaces, said rearward surfaces being for presenting leading surfaces having an angle of attack to the airstream during edgewise flight after reversal of the device upon release from the aircraft, whereby to generate lift and drag on the device, said casing containing a mass of light, tough, energy-absorbing material and an instrument payload, and means for weighting said device so that the centre of gravity thereof is located at a fixed predetermined position towards the rearward surfaces and sufficiently rearwardly and outwardly in the casing to result in stable edgewise flight with a substantial angle of attack when such rearward surfaces become the leading surfaces.

References Cited
UNITED STATES PATENTS 2,959,671  11/1960  Stevinson _____ 325—114
3,123,117  3/1964  Nourse et al. _____ 244—138 X JOHN W. CALDWELL, *Primary Examiner.*